Patented Apr. 13, 1948

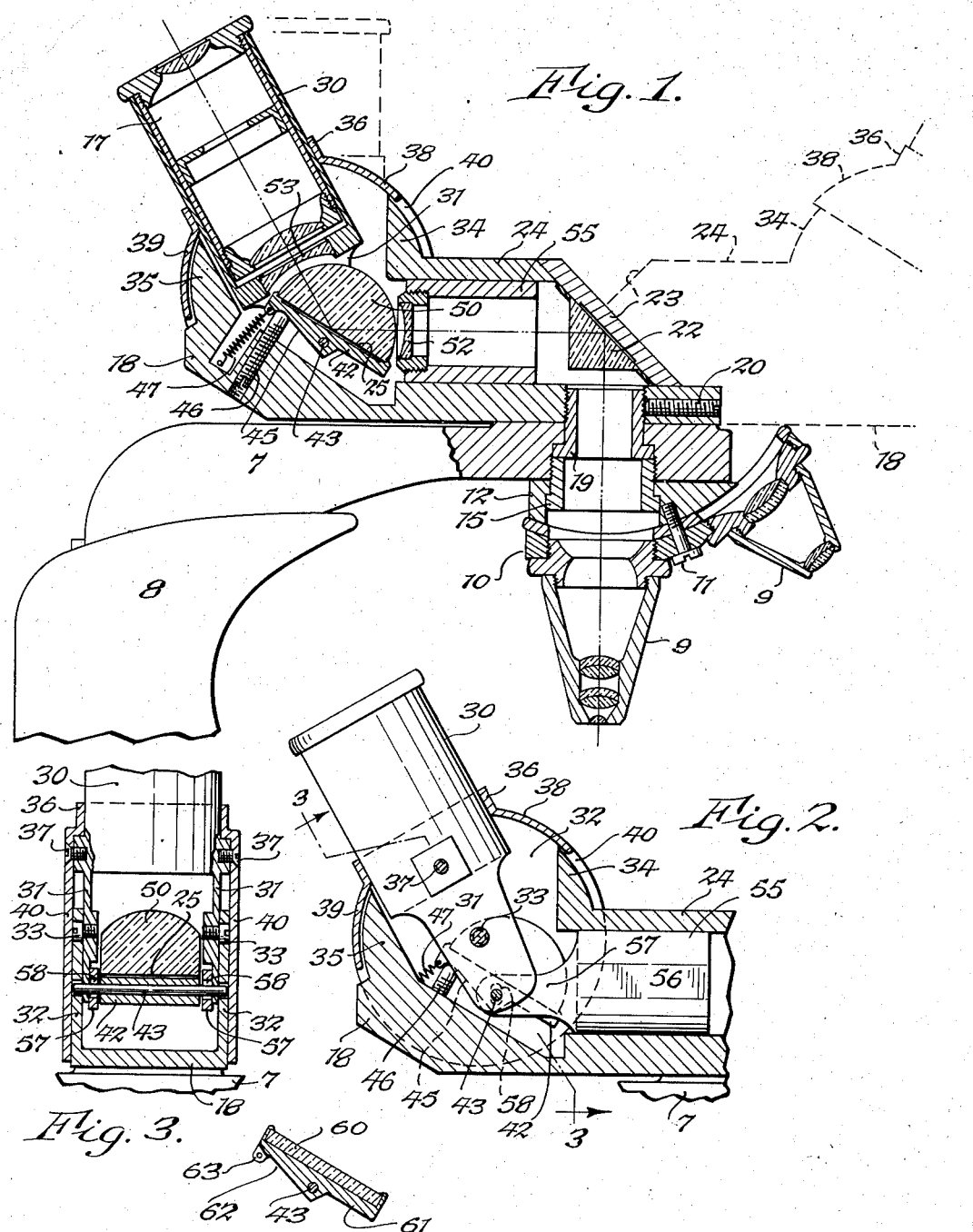
April 13, 1948.     H. N. OTT     2,439,526
ADJUSTABLE MICROSCOPE EYEPIECE MOUNTING
Filed April 14, 1944

2,439,526

UNITED STATES PATENT OFFICE 2,439,526

ADJUSTABLE MICROSCOPE EYEPIECE MOUNTING

Harvey N. Ott, Buffalo, N. Y.

Application April 14, 1944, Serial No. 531,001

2 Claims. (Cl. 88—39)

This invention relates to improvements in optical instruments, and more particularly to the optical systems thereof.

One of the objects of this invention is to provide an optical instrument with an ocular mounting of improved construction. Another object is to provide an ocular or eyepiece mounting of improved construction which extends at a distance from the optical axis of the objective so that it is more readily accessible to the user. Another object is to provide an improved ocular mounting by means of which the ocular may be moved into various angular relations to the vertical without requiring any adjustments other than shifting the ocular tube bodily into the desired angular position without effecting the field of view. A further object is to provide an improved microscope construction in which the ocular is mounted to swing about the axis of the objective so as to be accessible from all positions about the microscope. Another object is to provide an adjustable reflector of improved construction.

Other objects and advantages of this invention will be apparent from the following description and claims.

I have illustrated my invention as applied to a microscope but it is not intended to limit this invention for use with microscopes, since it is obvious that the same may be used with other optical instruments having an eyepiece and an objective.

In the accompanying drawings:

Fig. 1 is a fragmentary side elevation, partly in section, of a microscope having improvements embodying this invention applied thereto.

Fig. 2 is a fragmentary sectional elevation of a portion of the eyepiece and reflector shown in Fig. 1.

Fig. 3 is a sectional view thereof on line 3—3, Fig. 2.

Fig. 4 is a view showing a reflector of modified construction for reflecting light rays from the objective to the eyepiece.

The improvements embodying this invention may be mounted on a microscope arm 7 of any usual or suitable type, that shown being partly enclosed in an extension 8 of the main frame of the microscope, and the arm 7 is, of course, adjustable vertically by means of fine and coarse adjustments (not shown). 9 represents the objectives which may be mounted on a rotatable support 10 rotatable about a screw or other pivot 11 which extends into a stationary objective support 12 secured on the arm 7 of the microscope. It will, of course, be obvious that the microscope may have only a single objective, if desired. The fixed objective support 12 in the particular construction shown is secured to the arm 7 of the microscope by means of a flanged or shouldered sleeve 15 having one end thereof threaded into a correspondingly threaded hole of the arm 7.

In this microscope, the eyepiece is offset with reference to the objective so that the user of the microscope need not reach over the microscope to any material extent in order to look through the eyepiece. The eyepiece 17 is mounted on a combined eyepiece and reflector support 18, the reflectors being arranged in the support to direct the light from the objective into the eye. This support 18 may be mounted on the arm 7 of the microscope in any suitable or desired manner, and in the construction illustrated, a flanged or shouldered sleeve 19 is provided for this purpose having a flange at its lower end which extends into the larger portion of a hole in the arm 7. The upper end of this sleeve has a threaded engagement in a hole in the eyepiece support 18, and if desired, a set screw 20 may engage the threaded part of the sleeve 19 to securely hold the same in place in the eyepiece support 18.

The light from the objective passes upwardly through the sleeves 15 and 19 into the eyepiece support 18 and is reflected in any suitable manner, for example, by means of a prism 22 mounted in any suitable manner on a plate 23 which is secured across an open end of a tubular or cylindrical portion 24 of the eyepiece tube support 18. The prism 22 shown is a 45 degree prism, and consequently, reflects light at a right angle to the axis of the objective through the hollow tubular part 24 which extends laterally from the objective. The light reflected from the prism 22 passes to this tubular part to another reflector 25 which reflects the light into the eyepiece 17. This second reflector may, of course, be fixed with relation to the eyepiece and support 18 if the eyepiece is fixed on the support 18. Preferably, however, I provide a swinging or pivoted eyepiece which may be moved into a vertical position or at various inclinations to the vertical, as will be hereinafter described.

The connection between the eyepiece support 18 and the arm 7 of the microscope may, by means of the construction shown, be such as to permit the eyepiece to swing about the axis of the objective, this being done by constructing the flanged sleeve 19 so as to have a pivotal bearing in the arm 7. Consequently, when such pivotal arrangement is provided, the eyepiece support 18 may swing completely around the optical axis of the objective, so that the object or slide may be seen from any part of the microscope, the broken lines 18, for example, showing the eyepiece support in a position approximately 180 degrees from the full line position in Fig. 1.

In order to mount the eyepiece 17 so that it may be arranged in various angular relations to the eyepiece support 18, for example, in and between the two extreme positions shown in Fig. 1, in which the eyepiece is shown in an inclined position in full lines and in an upright position in broken lines, I have shown an improved and simplified construction for swinging the eyepiece 17 and at the same time swinging the reflecting surface 25 through half the angle through which the eyepiece is swung. In the construction shown for this purpose, I have provided an eyepiece tube or support 30 into which the eyepiece may be readily inserted and from which it may be removed to be replaced by another eyepiece. This eyepiece tube has downwardly extending legs or projections 31 at opposite sides thereof, see particularly Figs. 2 and 3, and these projections may be pivoted in any suitable manner on the support 18. This support is recessed or has a suitably formed cavity therein to receive the lower portion of the eyepiece tube, as clearly shown in Figs. 1 and 2, and has side walls 32 which partly close the sides of the recess or cavity of the eyepiece support. The legs 31 of the eyepiece tube 30 may be pivoted on the side walls 32, for example, by means of screws 33. The screws shown have their threaded portions engaging in holes in parts of the legs 31 of increased thickness and have their heads acting as pivots in suitably formed holes in the side walls 32 of the eyepiece support.

The recessed or hollowed-out portion of the support 18 through which the eyepiece extends may be enclosed in any suitable or usual manner in any positions of the eyepiece about its pivot 33, and for this purpose, the parts 34 and 35 of the eyepiece support 18 are preferably provided with cylindrical outer surfaces and a guard 36 is secured to the eyepiece tube 30 in any suitable manner, for example, by means of screws 37. This guard has cylindrical portions 38 and 39 which fit closely along the outer surfaces of the parts 34 and 35 of the eyepiece and reflector support, and the guard also has flat end walls 40 fitting closely about the side walls 32 of the support, so that the dust and other foreign materials are excluded from the hollowed-out portions of the eyepiece support 18.

The reflecting surface 25 may be arranged on any suitable reflector support 42 which is pivotally mounted to swing the reflecting surface into correct relation to the eyepiece, and in the construction illustrated, the reflector support 42 is pivotally mounted on a pivot rod or pin 43 which is also supported on the projecting legs 31 of the eyepiece shell 30. This pivot pin is located at a distance from the pivotal mounting 33 of the eyepiece. Consequently, the reflector support 42 will be moved back and forth on an arc about the pivotal mounting 33 when the eyepiece is swung into various positions, and can also swing about the pivot pin or rod 43.

In order to hold the reflecting surface 25 in correct relation to the eyepiece and to cause the same to swing to an angle equal to one-half of the angle through which the eyepiece swings, I provide the reflector support 42 with a cam face 45 on the underface thereof which is formed to contact with the end of a post or screw 46 mounted in fixed relation to the eyepiece support 18, and a spring 47 holds the reflector support 42 at all times in contact with the post or screw 46. This spring, as in the construction shown in Fig. 1, may extend into a hole or recess in the eyepiece support 18. The cam face 45 must, of course, be so designed that during the movement of the eyepiece about its pivot 33, the post in cooperation with the cam face 45 will hold the reflector support 42 at all times in such positions that the reflecting surface 25 will correctly reflect light from the reflector 22 into the eyepiece 17.

Any suitable or desired type of reflector may be mounted on the reflector support 42. Prism reflectors, such as the prism 22 are, of course, very satisfactory, providing the light rays enter and leave the prism at right angles to the sides of the two non-reflecting sides of the prism, so that no refraction results, but since the reflecting surface 25 must be swung about a pivot, a prism can obviously not be used. I have, however, devised a reflector, which is adjustable to different angular relations to the path of light without producing refraction, namely, by providing the same with a flat reflecting surface and with a curved surface, the center of curvature of which lies in the axis about which the reflector is swung, the light entering and leaving the reflector body through the curved surface on radial lines, so that no change of direction of the light rays due to refraction results. Such reflector body may be of semi-cylindrical or hemispherical form, the flat face of the reflector body passing through the center of curvature and serving as a reflector.

In the particular construction shown in Figs. 1 to 3, I have provided a reflecting body or lens 50 which is substantially of hemispherical form except that the opposite sides thereof are preferably cut off, since they serve no purpose. This hemispherical reflector has a plane reflecting surface extending through the center of the hemispherical body. When a reflector body of this type is used, a planoconcave lens 52 is employed which is preferably arranged in the cylindrical or tubular part 24 of the eyepiece support, and through which the light from the reflector or reflecting prism 22 passes into the hemispherical reflecting lens, and a similar planoconcave lens 53 is provided at the eyepiece, that shown being secured on the shell or casing 30 of the eyepiece. The concave surfaces of these two lenses face the spherical reflecting body 50 and are preferably of a curvature concentric with the axis of curvature of the hemispherical reflecting body 50. If a semi-cylindrical reflector body is used, the concave faces of the lenses 52 and 53 would, of course, be of semi-cylindrical form, with their curved faces concentric with the axis of curvature of the semi-cylindrical body, which axis would, of course, lie in the plane of the flat reflecting surface. A reflecting lens of this type, consequently, has all of the advantages of a prism reflector, and the additional advantage that it may be adjusted so that light may be reflected from the plano-reflecting surface of this lens at any desired angle.

With a hemispherical or semi-cylindrical reflector 50 and planoconcave lenses 52 and 53, it is desirable that these lenses be maintained at substantially uniform distances from the hemispherical reflector during the adjustments of the eyepiece about its horizontal pivotal mounting. The lens 53 will during the swinging of the eyepiece about its pivot 33 remain at approximately the same distance from the reflector 50, but this reflector will move to a certain extent toward and from the reflecting prism 22. I, therefore, preferably provide means for moving the lens 52 when the reflector 50 is moved. These means may be of any suitable or desired construction, and as illustrated by way of example, I mount the lens 52 on a slide 55 suitably mounted in the part 24 of the eyepiece support 18. For this purpose, the slide 55 may be of substantially cylindrical form to fit within an integral cylindrical portion of the eyepiece support 18 and the lens 52 is suitably mounted in this slide. The slide may have one or more flattened portions 56, Fig. 2, at opposite sides thereof, to hold the slide against turning and the slide also has a pair of arms 57 extending from the body portion of the slide toward the pivot pin or rod 43. The outer ends of these arms are provided with upright slots 58 through which the pivot pin or rod 43 extends. Consequently, during the swinging of the eyepiece 17 about its pivot 33, the pivot rod or pin 43 will cause the slide 55 to move back and forth so that the lens 52 will be maintained in approximately uniformly spaced relation to the hemispherical reflector 50.

In Fig. 4, I have shown a first surface reflector 60 which is mounted on a support 61 similar to the support 42 shown in Figs. 1 to 3, and having a suitable cam face 62. The reflector support may be substituted for the support 42 shown in Figs. 1 to 3 and may be pivoted on the pin or rod 43 and has an apertured lug 63 to which the spring 47 may be attached. The cam surface 62 is formed so that the reflector will be swung at an angle equal to half of the angle through which the eyepiece 17 is swung about its pivot 33. When the reflector shown in Fig. 4 is employed, the planoconcave lenses 52 and 53 may be omitted, as well as the slide 55.

By means of the construction shown, a plurality of adjustments of the eyepiece relatively to the objective are made possible. As has been explained, the eyepiece and its support 18 may swing about the flanged sleeve 19 and about the optical axis of the objective 9 into various positions about the microscope so that the objects can be seen from any desired position about the microscope. If this adjustment of the eyepiece about the optical axis of the objective is not required, the eyepiece support 18 may be secured on the arm 7 of the microscope or may be formed integral therewith.

The eyepiece may be swung at various inclinations to the vertical or into a vertical position, as has been described, thereby eliminating the need for an inclination joint of the kind in which the entire microscope body and stage swing to various inclinations about a base. If these adjustments of the eyepiece are not required, it will be obvious that the construction may be somewhat simplified by mounting the eyepiece in a fixed position on the eyepiece support 18, in which case, the reflector 50 or the reflector 60 may also be mounted in fixed relation to the support 18.

I claim as my invention:

1. In an optical instrument having an eyepiece tube pivotally mounted on an eyepiece support at a side of the optical axis of the objective to swing to different positions about an axis and receiving light from the objective through the medium of reflectors, that improvement which includes pivoting one of the reflectors on an extension of the eyepiece tube in spaced relation to the pivotal axis about which said eyepiece tube swings, a cam arranged in fixed relation to said reflector, and a stationary part on said eyepiece support with which said cam cooperates to move said reflector when said eyepiece is moved to reflect light from the other reflector into said eyepiece.

2. An optical instrument according to claim 1, and including a spring which urges said cam into engagement with said stationary part.

HARVEY N. OTT.

REFERENCES CITED

The following references are of record in the file of this patent:

UNITED STATES PATENTS

| Number | Name | Date |
| --- | --- | --- |
| 986,642 | Moller | Mar. 14, 1911 |
| 1,310,776 | Akeley | July 22, 1919 |
| 1,539,579 | Kucharski | May 26, 1925 |
| 1,602,251 | Iuidor | Oct. 5, 1926 |
| 1,837,993 | Patterson | Dec. 22, 1931 |
| 1,966,845 | Carbonara | July 17, 1934 |
| 2,014,874 | Bauersfeld | Sept. 17, 1925 |
| 2,132,122 | Ott | Oct. 4, 1938 |
| 2,135,049 | Harvey | Nov. 1, 1938 |
| 2,138,665 | Ott | Nov. 29, 1938 |
| 2,206,180 | Gerstenberger et al. | July 2, 1940 |
| 2,214,367 | Gallasch | Sept. 10, 1940 |
| 2,235,743 | Gagliardi | Mar. 18, 1941 |
| 2,317,988 | Forssberg | May 4, 1943 |

FOREIGN PATENTS

| Number | Country | Date |
| --- | --- | --- |
| 83,234 | Austria | Mar. 25, 1921 |